SUBSCRIPTION TELEVISION RECEIVER

Filed July 28, 1966 4 Sheets-Sheet 1

Inventor
Emil C. Walker
By James E. Tracy
Attorney

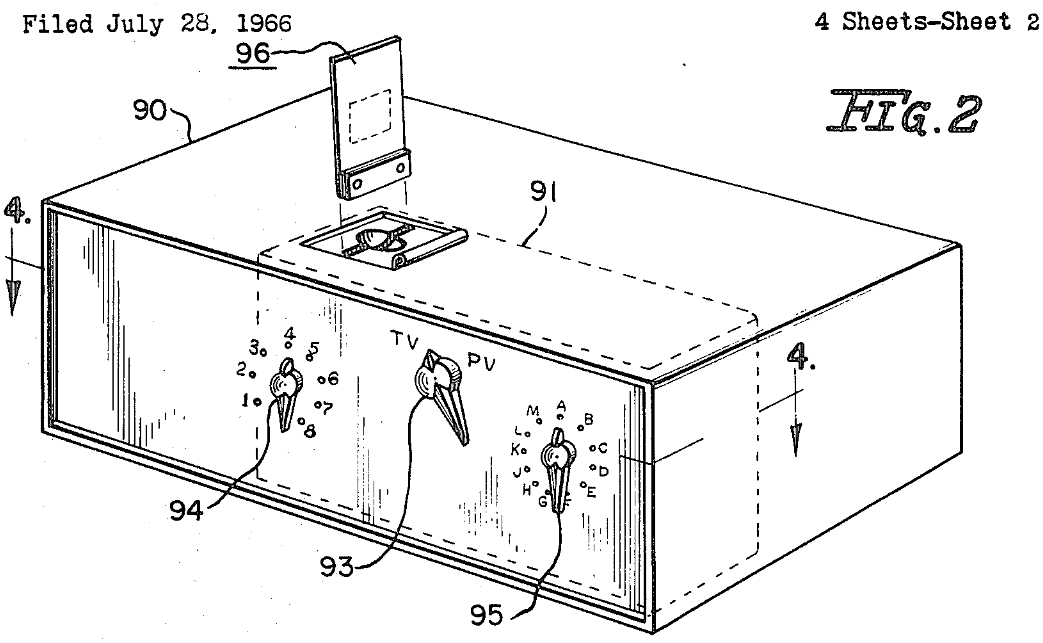
FIG. 3
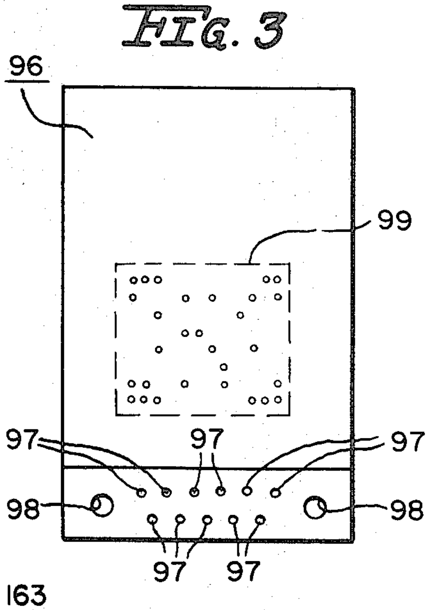
FIG. 7a
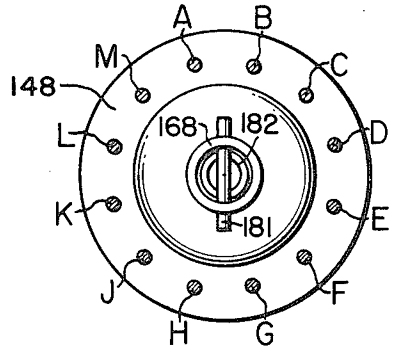
FIG. 7b
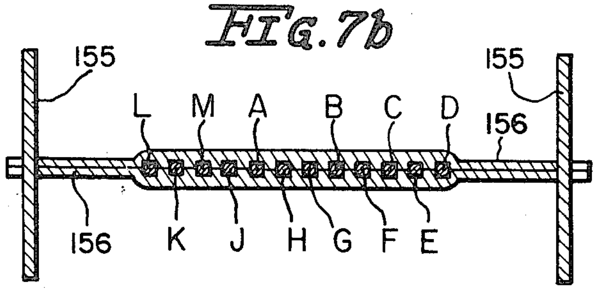
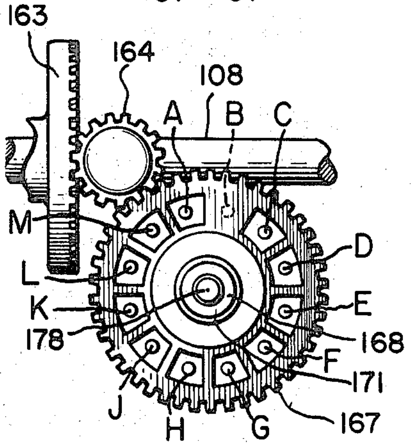
FIG. 6
Inventor
Emil C. Walker
By James E. Tracy
Attorney Inventor
Emil C. Walker
By James E. Tracy
Attorney Sept. 29, 1970 E. C. WALKER 3,531,583

SUBSCRIPTION TELEVISION RECEIVER

Filed July 28, 1966 4 Sheets-Sheet 4

Inventor
Emil C. Walker
By James E. Tracy
Attorney 3,531,583

SUBSCRIPTION TELEVISION RECEIVER

Emil C. Walker, Woodstock, Ill., assignor to Zenith Radio Corporation, Chicago, Ill., a corporation of Delaware Filed July 28, 1966, Ser. No. 568,599
Int. Cl. H04n *1/32*
U.S. Cl. 178—5.1 15 Claims

ABSTRACT OF THE DISCLOSURE

The disclosed subscription receiver includes a recording arrangement for registering separate charges, within a two-dimensional field on a removable planar element such as a card, only for those television programs viewed. An adjustable apparatus, controlled by the subscriber, must be positioned differently for each program before the television signal for that program may be intelligibly reproduced. Each recorded charge has a unique set of ordinate and abscissa coordinates within the two-dimensional field determined by the adjustment of the adjustable apparatus. The locations of the charges thus represent the identity of the specific programs viewed.

Figure 1:
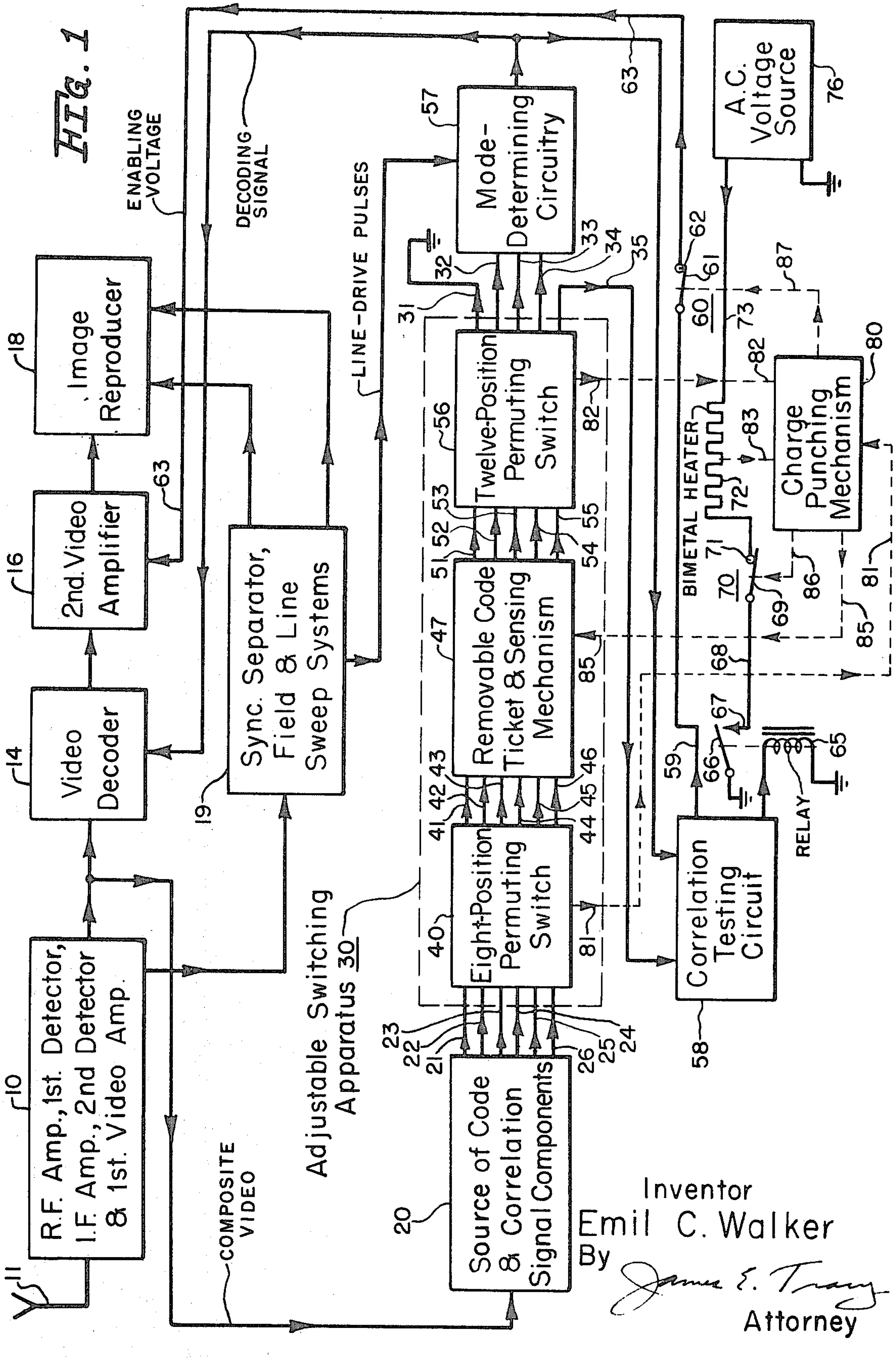

This invention relates to a subscription television receiver to which is transmitted television signals for a multiplicity of different programs. More particularly, it pertains to a charge recording arrangement by means of which charges are registered on a removable element only for those selected programs to which the subscriber actually subscribes.

Charge recorders for subscription television receivers have been developed in which separate program charges are registered on a recording medium that may be removed from each receiver. The removable element may contain all charges for a month, week or any convenient period. In one prior system, charge or use recording is achieved by punching a separate aperture in a removable strip or card for each program. The punched perforations are aligned in a row with their individual locations along the row being determined by, and therefore representing the identity of, the particular programs viewed. The punched card is then returned to the subscription television operating company and a bill is prepared in an amount based on the charge information represented by the perforations.

In another previous subscription television receiver, charges are registered on a tape by erasing portions of a prerecorded track extending along the length of the tape. As in the case of the punched holes, the positions of the erased sections indicate the specific programs to which the subscriber has subscribed.

While these prior systems do adequately make a permanent record of program usage for each subscriber, the total number of different programs, for which separate charges may be registered on a single removable element, is necessarily limited by the physical size of the element. To minimize cost in the overall operation of a subscription service, it is desirable that each charge record be capable of registering charges for a relatively large number of programs. However, also for economy reasons and in the interest of minimizing the size of the charge recording equipment required at each receiver, it is desirable to restrict the dimensions of the removable record element in order that it be as small as possible. The conflicting objectives of recording a large number of programs on a very small removable element have not been attained with the charge recording devices of the prior art.

These objectives are, however, realized by the present invention which provides a relatively inexpensive recording system capable of registering on a single and extremely small removable element charge information for each selected program, of a substantial number of available transmitted subscription television programs, viewed by the subscriber.

It is, therefore, an object of the present invention to provide a new and improved subscription television receiver.

It is another object to provide a novel recording system for a subscription television receiver.

A subscription television receiver, constructed in accordance with one of its aspects, comprises an adjustable apparatus having a multiplicity of different conditions of adjustment and which must be established by the subscriber in a different predetermined condition of adjustment for each of a multiplicity of different subscription programs before the television signal for that program may be intelligibly reproduced. There is a charge register including a removable planar element having a two-dimensional recording field effectively divided into a multiplicity of areas each of which has a unique set of ordinate and abscissa coordinates within the field and each of which areas is assigned to, and provides the recording medium for, a different respective one of the multiplicity of different subscription television programs. The receiver also comprises control means at least partially responsive to adjustment of the adjustable apparatus for controlling the charge register to record on the removable element a separate charge in each of the areas assigned to those selected programs to which the subscriber subscribes.

The features of this invention which are believed to be new are set forth with particularity in the appended claims. The invention, together with further objects and advantages thereof, may best be understood, however, by reference to the following description in conjunction with the accompanying drawings in which:

FIG. 1 schematically illustrates, primarily in block diagram form, a subscription television receiver which embodies the invention; and FIGS. 2–7*b* are various detailed views of portions of the receiver of FIG. 1.

A subscription television transmitter for producing a coded television signal of the type to be utilized by the receiver of FIG. 1 is shown in detail in Pat. No. 3,244,806, issued Apr. 5, 1966, in the name of George V. Morris, and assigned to the present assignee. Reference is made to the Morris case for details of the transmitter. Very briefly, in the transmitter the video signal is coded by switching it at random between one operating mode, in which the video is delayed with respect to synchronizing signals, and another mode wherein the video is translated normally or without delay. The mode changes are made in response to the amplitude variations of a rectangular shaped coding signal developed by mode-determining circuitry and the instants at which those amplitude variations occur, and therefore the mode changes, are determined in part by the particular instantaneous adjustment of an adjustable switching apparatus. That apparatus serves to permutably apply a series of random code signal components to a plurality of input circuits of the mode-determining circuitry to effect random actuation thereof. A different condition of adjustment preferably is employed for each subscription telecast or program.

The receiver operates in complimentary fashion in order to decode the coded video signal produced and transmitted by the transmitter. In other words, a similar mode-determining circuit and switching apparatus, which must be adjusted to the same setting as the switching apparatus at the transmitter, operate in response to the same random code signal components to develop a decoding signal having a waveshape identical to that of the coding signal. The decoding signal is then employed to delay those time intervals or segments of video information which were not delayed at the transmitter, while permitting the delayed intervals of the video signal to be translated through the receiver video channel without introducing any delay, thereby to achieve decoding.

The receiver is schematically shown in FIG. 1 and will now be described in greater detail. A more thorough explanation, however, may be found in the aforementioned Morris Pat. 3,244,806. The FIG. 1 drawing is adequate to understand the manner in which the charging apparatus of the present invention functions in conjunction with a subscription television receiver.

In FIG. 1, a cascaded arrangement of a radio frequency amplifier, a first detector or oscillator-mixer, an intermediate frequency amplifier of one or more stages, a second or video detector, and a first video amplifier is represented by a single block 10 having input terminals connected to a receiving antenna 11 and output terminals coupled through a video decoder 14 to input terminals of a second video amplifier 16 which, in turn, is coupled to the input of an image-reproducing device or picture tube 18. Video decoding device 14 may be identical in construction to the video coder employed in the transmitter and includes a time delay network and an electronic switch having two operating conditions. In one condition, the delay network is interposed in the video channel to delay the video with respect to the sync information, and in the other condition the delay network is removed from the video channel so that the video signal is translated through the decoder without the introduction of any significant time delay.

An output of the first video amplifier in block 10 is coupled to a synchronizing signal separator which energizes the usual field-sweep and line-sweep systems that are connected, in turn, to the deflection elements associated with picture tube 18. For convenience, the sync separator, and the field- and line-sweep systems have been shown by a single block 19.

The audio circuitry of the receiver has not been shown in FIG. 1 since that circuitry is not necessary to illustrate the operation of the present invention.

The random code signal components, developed in the transmitter and employed to code the video signal, take the form of signal bursts occurring during vertical retrace and exhibiting at random any one of five different frequencies selected from a group of six frequencies designated $f_1$–$f_6$. The sixth frequency of the group is used for correlation testing, a concept to be briefly described subsequently. It should be noted in passing that the frequency assigned to correlation testing may change from one program to the next. In order to control the decoding apparatus at the receiver, the code signal bursts as well as the correlation signal bursts are added to the composite video signal in the transmitter during the vertical-retrace intervals. Separating, filtering and rectifying circuitry, shown by block 20, has an input coupled to the output of the first video amplifier in block 10 and produces from the composite video signal during each field-retrace interval rectified signal bursts of frequencies $f_1$–$f_6$ on respective ones of six different output terminals of block 20.

The six output terminals are respectively connected to six different input conductors 21–26 of an adjustable switching or permuting apparatus 30 which has a series of five output conductors 31–35. Adjustable apparatus 30 has a multiplicity of different conditions of adjustment and must be established by the subscriber in a different predetermined condition of adjustment for each subscription program before the television signal for that program may be intelligibly reproduced. It corresponds in function to the switching apparatus referred to above in the transmitter and in each condition of adjustment establishes a different interconnection or permutation pattern between input conductors 21–26 and output conductors 31–35. Switching apparatus 30 permutes the applied signal components as required before they are used for decoding the coded video signal and for correlation testing. A preferred form of switching apparatus 30 is shown in FIGS. 2–7*b*, to be described hereinafter. The transmitter switching apparatus may be identical.

As schematically illustrated in FIG. 1, the overall permutation or transposition pattern established between conductors 21–26 and conductors 31–35 is determined by three different permuting or matrix switching devices connected in series or cascade. More specifically, input conductors 21–26 are respectively connected to six different inputs of an eight-position permuting switch 40 having six different output terminals. Switch 40 may be of relatively simple construction and preferably takes the form of a rotary wafer switch having eight different detented positions, designated by the numerals 1–8, in each of which the six switch inputs are permutably connected to the six switch outputs in accordance with a different transposition or interconnection pattern. The six outputs of permuting switch 40 are connected via respective ones of six conductors 41–46 to six different inputs of another permuting device 47 which has five different outputs. The inputs and outputs of unit 47 are permutably interconnected by means of a series of five separate electrically conductive circuit paths contained in a removable code ticket. Sensing elements or probes, connected to the inputs and outputs of permuting unit 47, sense the conductive paths. In the illustrated embodiment it is contemplated that a different code ticket, with a different arrangement of conductive circuit paths to achieve different interconnection patterns, will be employed for each series of 96 consecutive subscription television programs. The makeup of block 47 will be described in greater detail hereinafter, but for a more complete description thereof attention is addressed to copending patent application, Ser. No. 514,050, filed Dec. 15, 1965, in the name of Emil C. Walker, and assigned to the present assignee.

The five outputs of permuting device 47 are connected by way of respective ones of five conductors 51–55 to five different inputs of a twelve-position permuting switch 56 having five outputs to which are respectively connected the five output conductors 31–35 of adjustable switching apparatus 30. As in the case of switch 40, switch 56 may merely take the form of a twelve-position rotary wafer switch in each detented position of which a different interconnection pattern is established between the inputs and outputs of the switch.

Output conductor 31 is connected to ground; hence, any signal components emerging on output 31 are eliminated and serve no function. Output conductors 32–34, on the other hand, are connected to respective ones of a series of three input circuits of a unit 57 referred to as the mode-determining circuitry and which corresponds in construction to the transmitter mode-determining circuitry. Unit 57 has another input connected to the line-sweep system of block 19 to receive line-drive or horizontal-drive pulses thereover. The mode-determining circuitry includes a counting or cycling mechanism provided by a 7:1 blocking oscillator cascade connected to a bistable multivibrator. The blocking oscillator, driven by the line-drive pulses, in turn drives the multivibrator the output of which is connected to the electronic switch in video decoding device 14. Mode-determining circuitry 57, in response to the line-drive pulses, therefore produces for application to the video decoder a decoding signal of rectangular waveshape having an amplitude change occurring after every seven line traces.

Output conductors 32–34 are connected to different inputs of the bistable multivibrator. Since the code signal components occur at random during each field-retrace interval, the periodic actuation of the mode-determining circuitry under the influence of line-drive pulses is interrupted during each vertical retrace by these code signal components. The effect of the code signal components is to determine the phase of the decoding signal during vertical retrace. Since decoder 14 is actuated to make a mode change in response to each amplitude change of the decoding signal, the waveform of that decoding signal reflects or represents the code schedule in accordance with which the decoding device operates.

As mentioned, the subscriber is obliged to establish switching apparatus 30 in a different condition of adjustment for each program to achieve decoding. For any given program this is achieved by (1) inserting the appropriate code ticket in unit 47, and (2) by manipulating switches 40 and 56 to particular prescribed positions. While it is contemplated that each ticket will be used for a series of 96 consecutive programs, the combination setting of switches 40 and 56 will differ for each program in the series.

A correlation testing arrangement is provided to effectively examine the adjustment of switching apparatus 30 to determine if it is properly adjusted for any given program. Specifically, output conductor 35 of apparatus 30 is connected to one input of a unit 58 referred to as the correlation testing circuitry. Another input of unit 58 connects to the output of mode-determining circuitry 57. As mentioned previously, for each program one of the available frequencies $f_1$–$f_6$ is selected at the transmitter to provide correlation signal components for correlation testing. These components effectively represent the required correct adjustment in accordance with which apparatus 30 should be adjusted. If apparatus 30 is correctly adjusted (namely its setting agrees with that of the corresponding switching apparatus at the transmitter), the signal bursts of the frequency selected for correlation testing will be applied to unit 58. The correlation testing circuitry includes a comparator, such as a gate circuit, to which is supplied the correlation signal components from switching apparatus 30, and the decoding signal from mode-determining circuitry 57.

The transmitter is operated so that one correlation component is produced during each field-retrace interval and at a time when the bistable multivibrator in the transmitter mode-determining circuitry is established in a predetermined one of its two conditions. As a consequence, the correlation signal components represents the setting of the adjustable switching apparatus of the transmitter and they are transmitted to the subscriber receivers for comparison purposes to check the adjustment of the switching apparatus at each receiver. Since the waveshape of the decoding signal is influenced by switching apparatus 30, that waveshape represents the instantaneous setting of the switching apparatus. Correlation testing circuitry 58 compares the waveshape of the decoding signal with the series of correlation signal components received from the transmitter. If the receiver switching apparatus is properly set up, there will be developed within unit 58 an indication of correct correlation, in the form of a single control pulse, during each field-retrace interval. When there is an uninterrupted series of these pulses throughout a ten-second testing interval, a control effect is produced which confirms a correct setting of adjustable switching apparatus 30. This is achieved in the aforesaid Morris Pat. 3,244,806 by means of a mechanical timing mechanism which, in response to the uninterrupted series of control pulses, closes a set of switch contacts.

One function performed by the switch contacts is to energize an enabling circuit for the receiver to effect intelligible reproduction of the decoded television signal. This may be facilitated in many different ways. As suggested in the Morris case, a vacuum tube may be employed for the second video amplifier with its filament circuit completed through the contacts closed by the timing device in the correlation testing circuitry. In this way, the A.C. voltage source for the filament is not coupled thereto until the testing circuitry confirms correct correlation.

In the present receiver, unit 58 may likewise control the operability of video amplifier 16 in the manner disclosed in the Morris case. Hence, an output of unit 58 is coupled to an input of the second video amplifier to apply thereto an enabling voltage, namely the filament voltage, when correct correlation has been verified. Specifically, unit 58 is connected via a conductor 59 to the movable contact 61 of a normally closed, single pole-single throw switch 60, the fixed contact 62 of which is connected by way of a conductor 63 to the filament of video amplifier 16. Switch 60 is controlled and may be opened by mechanical apparatus to be described. The switch is shown in detail in FIG. 5.

Correlation testing circuitry 58 also controls a charge register and effects actuation thereof when correct correlation has been confirmed. To this end, an output of unit 58 is connected to one terminal of a relay 65 the other terminal of which is grounded. The contacts closed by the timing mechanism in unit 58 may also be employed to complete an energizing circuit for relay 65, which controls a pair of normally-open contacts 66, 67. Movable contact 66 is grounded, while fixed contact 67 is connected via a conductor 68 to the movable contact 69 of a single pole-single throw switch 70 the fixed contact 71 of which is connected to one terminal of a bimetal heater 72. Switch 70 is illustrated in detail in FIG. 5 and is controlled by mechanical apparatus to be described. The other terminal of heater 72 is connected by way of a conductor 73 to one output terminal of an A.C. voltage source 76 having its other output terminal grounded. Source 76 may be the same source that provides filament voltage, via conductors 59 and 63 and switch 60, to amplifier 16. Bimetal heater 72 (shown in FIGS. 4, 5 and 5*a*) constitutes a heater grid affixed to a cantilever mounted bimetal strip. When the heater grid is energized by source 76, the bimetal strip bends or deflects.

The charge register of the invention includes a punching mechanism which is illustrated in detail in FIGS. 2–7*b*. It is schematically shown in FIG. 1 by a single block 80. For each program viewed the charge punching mechanism perforates the code ticket at a unique point location, in a two-dimensional recording field, having ordinate and abscissa coordinates determined by the adjustments of switches 40 and 56 respectively. The punching mechanism is therefore controlled by both permuting switch 40 and permuting switch 56 and for that reason there are dashed construction lines 81 and 82 respectively connecting those switches to block 80 to schematically illustrate that control. Bimetal heater 72, when energized, actuates or triggers the punching mechanism to drive a punching or piercing device into the code ticket at the location or area determined by switches 40 and 56 to record a charge. Hence, a dashed construction line 83 has been shown between element 72 and unit 80, and a dashed construction line 85 appears between blocks 80 and 47. The punching mechanism also controls switches 70 and 60 and thus dashed lines 86 and 87 are illustrated between unit 80 and the switches.

Directing attention now to FIGS. 2–7*b*, and particularly to FIG. 2, all of the circuitry and equipment required to convert a conventional television receiver to the subscription television receiver of FIG. 1 is housed within a metal cabinet 90. Preferably, the cabinet is mounted on top of or in close proximity to the conventional television receiver and a cable (not shown) provides the necessary circuit connections therebetween. The code ticket sensing or reading mechanism and the charge recording equipment are contained within an assembly designated by the numeral 91 and illustrated in dashed outline.

A control knob 93 positioned on the front of cabinet 90 controls, among other things, a TV–PV switching unit to be described. Control 93 is to be manipulated by the subscriber to either one of two different operating positions designated TV and PV, respectively. As shown in FIG. 2, control 93 is established in its TV position; rotating it approximately 120° in a clockwise direction positions the control knob in its PV position. Control 93 is to be actuated by the subscriber to its PV position for the reception and decoding of a subscription television program and to its TV position for the reception of conventional nonsubscription programs when the decoding apparatus is to be effectively disassociated from the television receiver. The indicia PV is a shorthand designation of assignee's "Phonevision" subscription television system. The TV–PV switching unit contains the necessary switching contacts for energizing the decoding apparatus and incorporating it into the conventional television receiver when control 93 is adjusted to its PV position, and for deenergizing the decoding apparatus and converting the television receiver to its conventional form when the control is established in its TV position.

A pair of rotatable control knobs 94 and 95 are also positioned on the front of cabinet 90. Control 94 has eight different detented positions, numbered 1–8 as indicated in FIG. 2. It controls the position of permuting switch 40 and at the same time controls the punching mechanism to select the ordinate coordinate of the area, in the recording field of the code ticket, to be punched to record a charge. Control 95 has twelve positions, identified by the letters A–M as illustrated in FIG. 2, and controls the adjustment of permuting switch 56. Control 95 also adjusts the punching mechanism to select the abscissa coordinate of the area to be perforated. For any given program, the subscriber is obliged to adjust each of controls 94 and 95 to particular positions, the combination of those positions being different for each of the programs to be decoded by the removable code ticket.

One such code ticket, denoted by the reference number 96, is shown in each of FIGS. 2–5*a*. As mentioned, the construction of the code ticket is illustrated and described in considerably greater detail in copending application Ser. No. 514,050, Walker. Code ticket 96 constitutes a code bearing element which contains (in its lowermost portion) in concealed or hidden form code information representing a particular selected interconnection pattern between conductors 41–46 and conductors 51–55. The stored code information in ticket 96 takes the form of a series of five concealed electrically conductive circuit paths insulated from one another.

More specifically, the code ticket is constructed by taking a strip of flat cardboard and folding an end portion into a series of six accordion pleats. Five electrically conductive metallic patches, such as aluminum foil, are respectively affixed to five of the pleats to the end that the lower portion of the ticket provides a laminated arrangement of alternate layers of aluminum foil and cardboard, with each metallic patch being insulated from the others. Each of the five conductive laminations is effectively assigned to a respective one of the five conductors 51–55 and, when the code ticket is sensed or read by the sensing mechanism, connects the assigned conductor to one or more of conductors 41–46. The code ticket is read by piercing it with five sensing probes or pins, respectively connected to conductors 51–55, and with six sensing pins respectively connected to conductors 41–46. The eleven holes made in ticket 96 by the eleven sensing elements are shown in FIG. 3 and designated by the reference number 97. Apertures 98 provide pilot holes for aligning or indexing code ticket 96 in the sensing mechanism. The two-dimensional recording field of ticket 96 in FIG. 3 is designated by the dashed construction line 99.

It is contemplated that each subscriber will be supplied, prior to each series of 96 consecutive programs, with the code-bearing ticket needed to decode those programs. While the permutation pattern established by the code ticket will be the same for all 96 programs, permuting switches 40 and 56 must be adjusted differently for each of the 96 programs that the subscriber wishes to utilize. As will be seen, each time the ticket is employed to decode a program it will be punched in a particular location in field 99 unique for that program to provide a record that the ticket was so used. By counting the perforations within recording field 99 in FIG. 3 it is apparent that ticket 96 has been used to decode 29 of the 96 programs. At the end of the period covered by the 96 programs, the code ticket is returned to the subscription television operating company. A bill may then be prepared and sent back to the subscriber based on the use punches that have been made in the recording field 99 of his code ticket. Because of the coordinate positioning of the punches, they may be conveniently computer evaluated to determine the program material viewed and the charges to be assessed for such viewing.

Consideration will now be given to the details of switching apparatus 30 and the charge recording mechanism as depicted in FIGS. 4–7*b*. There is a U-shaped metallic base support frame having a bight portion or base **100*a* which is parallel to and rigidly affixed to the bottom of cabinet 90 (see particularly FIG. 5), a left upright support 100*b*, and a right upright support 100*c*. Parallel front and rear metallic support plates 102, 103, respectively are rigidly connected to left and right upright supports 100*b*, 100*c*, see particularly FIG. 4. As shown, the arrangement is so oriented that front support plate 102 is parallel and adjacent to the front wall of cabinet 90**.

Figure 4:
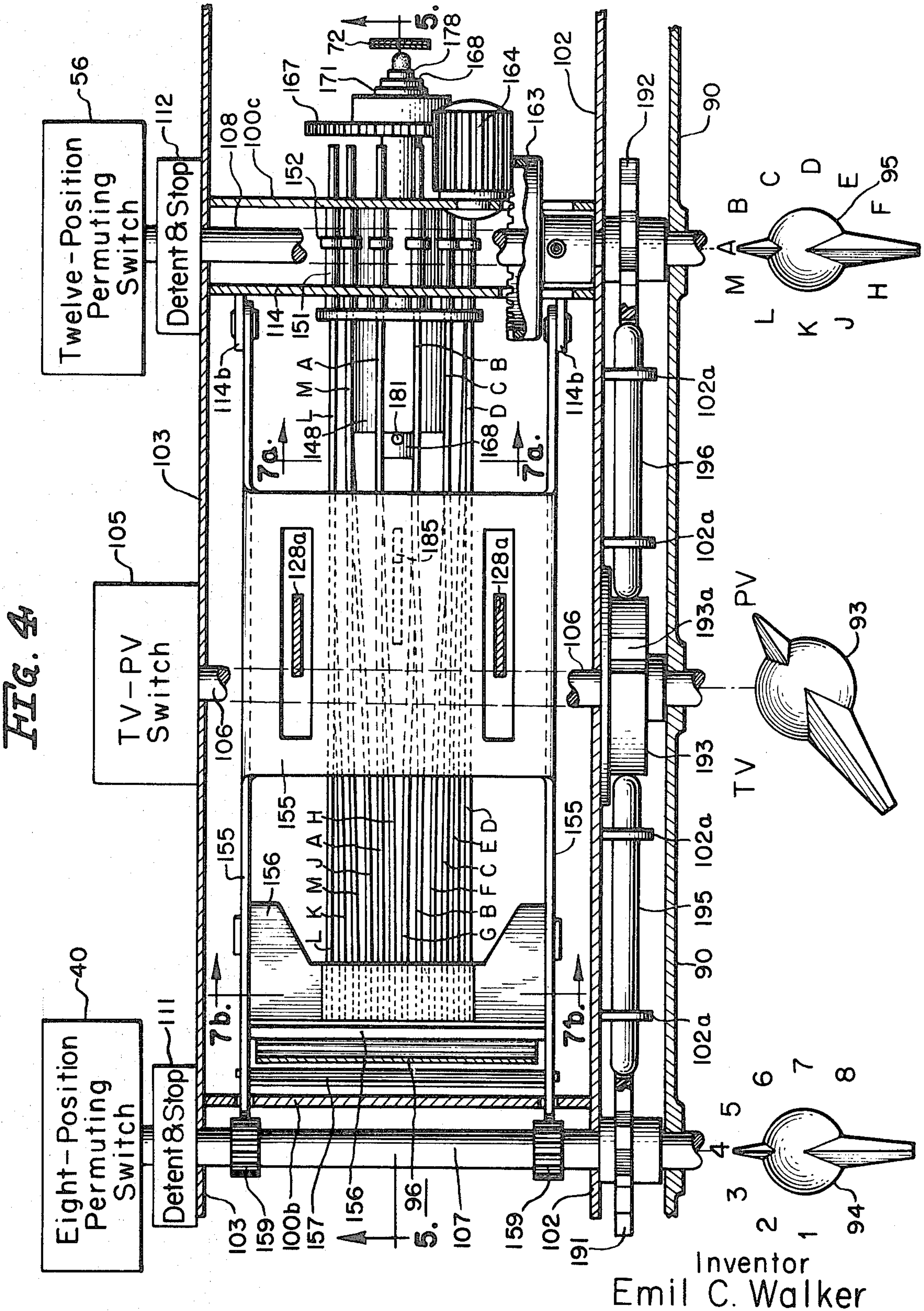

The TV-PV switch, mentioned previously, is shown by block 105 in FIG. 4 and is mounted to and behind rear support plate 103. Switch 105 is controlled by knob 93 by means of an operating shaft 106 which is journaled in apertures in the front wall of cabinet 90 and in front and rear plates 102, 103, respectively. In similar fashion, permuting switches 40 and 56 are adjusted by their respective controls 94, 95 by means of a pair of operating shafts 107, 108 which extend through apertures in cabinet 90, and in plates 102 and 103. An appropriate detent device is provided to insure that the eight different positions of control 94 and switch 40 are discrete detented positions. Moreover, it is desired that rotation of control 94 and switch 40 be confined to positions 1–8. For this reason a detenting and a stop or limit of travel mechanism is employed. It is schematically shown in FIG. 4 by block 111. Similarly, the twelve positions of control 95 and switch 56 not only should be discrete detented positions but in addition travel should be limited between positions A–M through the intermediate positions and not from A to M or M to A directly. Hence, an appropriate detenting and stop mechanism, shown by block 112, may be employed.

Figure 5:
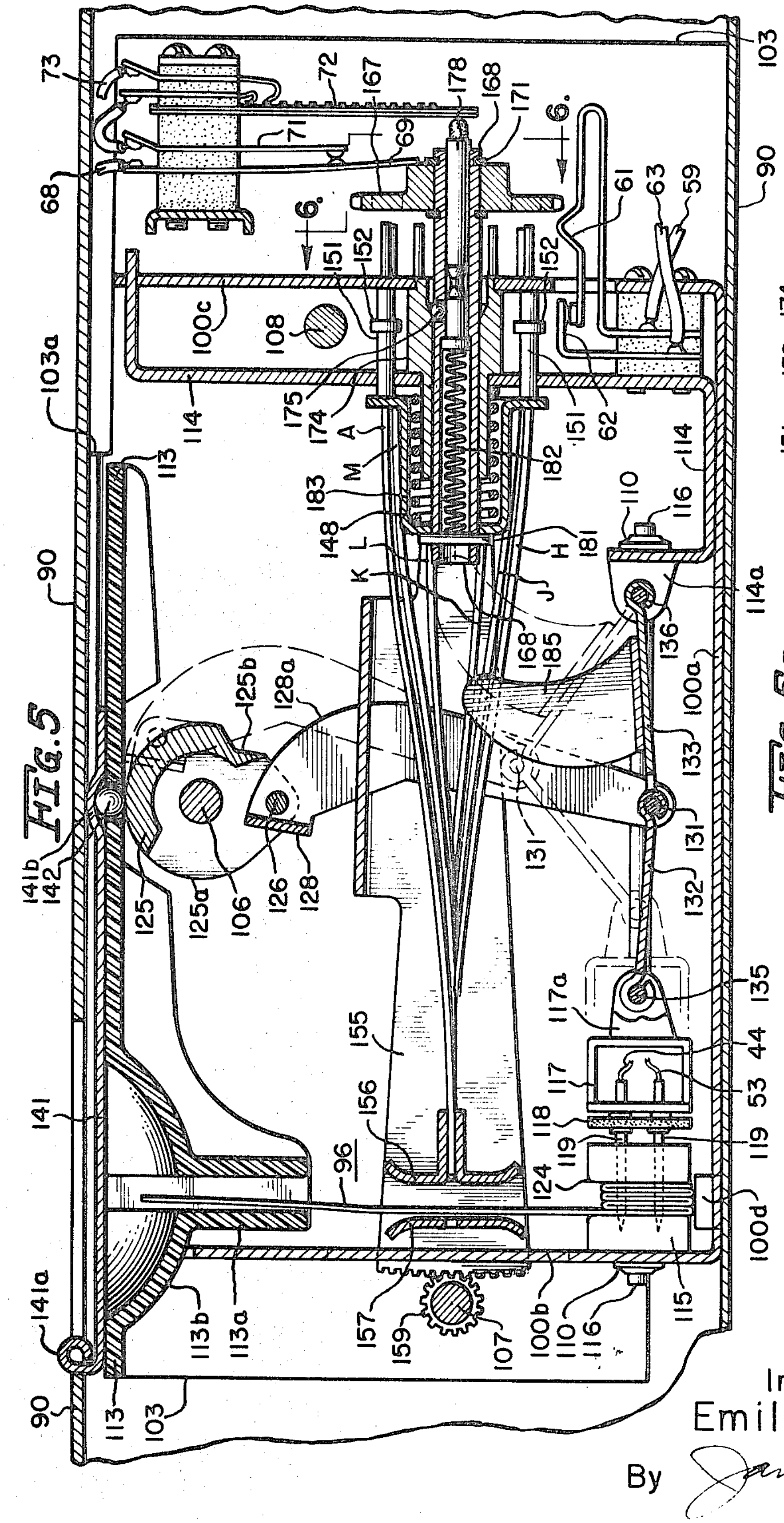

A top plate 113 (see FIG. 5), preferably made of plastic, is rigidly connected to and between plates 102 and 103. A die block 115, preferably constructed of plastic, is rigidly affixed to the right side of left upright support **100*b*, see FIG. 5. A pair of horizontal guide rods or rails 116 (only one of which is shown in FIG. 5) extends from upright support 100*b* and through bores in die block 115 to a support bracket 114 which is rigidly affixed to base 100*a*. Each of guide rods 116 is captivated in position by a pair of push-on spring fasteners 110**. A somewhat similar arrangement of guide rails is shown in the copending Walker application Ser. No. 514,050.

A U-shaped metallic channel support frame 117 is guided by rods 116 for horizontal movement in the axial direction of the rods. This is facilitated by apertures at the terminal ends of channel frame 117 through each of which a respective one of the two rods 116 extends. Along the open end of U-shaped channel 117 there is rigidly affixed a plastic bar or strip 118. The previously discussed eleven electrically conductive sensing probes or pins are molded into plastic member 118. Only two of the sensing pins, denoted by the reference number 119, are shown in FIG. 5. The spacing of the eleven pins is indicated by perforations 97 which are made by the pins in ticket 96. They are separated into top and bottom rows, with six in the top row and five in the bottom. The six sensing elements in the top row are respectively connected to conductors 41–46, while the five sensing elements in the bottom row are connected to respective ones of conductors 51–55. As illustrated in FIG. 5, sensing pins 119 have pierced the laminated portion of code ticket 96. As fully described in the copending Walker case, Ser.

No. 514,050, the sensing elements in the top row are permutably connected to the sensing elements in the bottom row by means of the metallic laminations in the code ticket, thereby to permutably connect conductors 41–46 to conductors 51–55.

Each end of channel frame 117 is connected to support bracket 114 by a respective one of a pair of coil springs (not shown). These springs bias or urge frame 117 and probes 119 toward bracket 114. A plastic stripper and pin guide plate or bar 124 is also slidably mounted on guide rods 116 for limited movement in the axial direction of the rods. The rods extend through bores in the ends of bar 124. A pair of coil springs (not shown) connect respective ends of stripper plate 124 to the corresponding ends of channel frame 117. In this way, when frame 117 is moved to the right to the position shown in dashed line construction, the coil springs will be sufficiently tensioned to urge plate 124 toward frame 117.

A guide channel or bore for each of the eleven sensing probes 119 is provided in each of plate 124 and die block 115. These guide holes align with their associated respective sensing probes in order that the probes may be guided and accommodated as frame 117 is moved toward left upright support **100*b* from its dashed line position to its full line position, shown in FIG. 5. Rigidly mounted to holder 118 at the ends thereof are a pair of pilot pins (not shown) that align or register with bores in both stripper plate 124 and die block 115 and also with pilot holes 98 in ticket 96. The pilot pins facilitate accurate indexing or registration of the sensing probes 119 with their associated guide holes in stripper bar 124**.

Channel frame 117 may be moved horizontally by the subscriber in the axial direction of guide rods 116 by manipulating control 93. Specifically, a die-cast crank member 125 is rigidly connected to operating shaft 106 between support plates 102 and 103. The crank has a pair of spaced apart, parallel portions **125*a*, only one of which is seen in FIG. 5. A hinge pin or rod 126, parallel to shaft 106, extends between and is journalled in apertures of the two portions 125*a*. A hinge member or toggle link 128 is freely mounted on and hangs from hinge pin 126. Specifically, the toggle link is somewhat U-shaped in construction having an aperture in each of the two projecting parallel legs 128*a*, only one of which is shown in FIG. 5, in which apertures pin 126 is journaled. The pin lies adjacent and is parallel to the bight portion of hinge member 128. The lower end of each leg 128*a* has an aperture for receiving and supporting a hinge pin 131, which in turn supports for free rotation one end of each of a pair of hange members 132, 133. The other end of hinge 132 is connected to a pair of projecting tabs 117*a*, struck out of channel frame 117 (only one of which is shown in FIG. 5), by means of a hinge pin 135 which extends through and is journaled in apertures in tabs 117*a*. The other end of hinge 133 is connected to a pair of tab portions 114*a* (only one of which is shown in FIG. 5), struck out of bracket 114, by means of a hinge pin 136** which is journaled in an aperture of each of the tab portions. The various hinge pins are held or captivated in position by a series of retaining rings.

The toggle linkage provided by hinges 128, 132 and 133 may be actuated between the two extreme positions, respectively shown by full line and dashed line construction in FIG. 5, by manipulation of control 93. The full line construction illustrates the position of crank 125 and the toggle linkage when control 93 is established in its PV position. The dashed line construction, of course, illustrates their positions when control 93 has been actuated to its TV position.

As illustrated in FIG. 5, when crank 125 is rotated clockwise from its TV position to its PV position, toggle link 128 and consequently pin 131 lower or descend. Since hinge pin 136 is fixed both vertically and horizontally, whereas hinge pin 135 is only held (by channel frame 117 and guide rods 116) against vertical movement, lowering of pin 131 causes pin 135 and hence channel frame 117 to move toward left upright support **100*b*. Conversely, when knob 93 and crank 125 are then rotated in a counterclockwise direction from the PV posoition to the TV position, hinge pin 131 raises and draws hinge pin 135 and channel frame 117 toward right upright support 100*c***.

Plastic top plate 113 includes a ticket chute or slot portion **113*a* dimensioned to receive code-bearing planar element 96. The width of the ticket chute is slightly larger than the thickness of the laminated portion of code ticket 96. As will be explained shortly, the subscriber will be permitted to insert code ticket 96 into slot 113*a* only when the sensing mechanism is established in its TV position. Hence, at that time sensing pins 119 will be withdrawn out of the space to be occupied by the laminated portion of the code ticket. The lower end of the deposited code ticket is supported or arrested by a pair of tabs 100*d* (only one of which is shown in FIG. 5) struck out of base support 100*a***.

A metallic slide cover 141 is provided for covering ticket slot **113*a*. Specifically, cover 141 is slidably mounted on top of plastic top plate 113 by a pair of turned-in retaining lips 103*a* formed by the top edges of the front and rear plates 102, 103. Only the retaining lip 103*a* of plate 103 is shown in FIG. 5. The left edge of cover 141, as shown in FIG. 5, is rolled to form a gripping portion 141*a*** to permit the subscriber to conveniently move the slide cover between its closed position shown in FIG. 5 and its open position shown in FIG. 2.

Slide cover 141 may be pushed to its open position only when control 93 and consequently crank 125 are established in their TV position. This is achieved by means of a metallic interlock bearing ball 142 and a V-shaped notch or groove **125*b* formed in crank 125 and extending in the axial direction of shaft 106. Interlock ball 142 lies and is captivated within an aperture, formed in top plate 113, which prevents any substantial horizontal movement of the ball. Limited vertical movement is permitted, however, being restricted by crank 125 and slide cover 141. In the TV position, notch 125*b* is positioned immediately below ball 142; the ball therefore drops into the notch at that time. With ball 142 in notch 125*b*, slide cover 141** is unobstructed and may be moved by the subscriber to its open position.

Interlock ball 142 also prevents clockwise movement of crank 125 from its TV to its PV position as long as slide cover 141 is in its open position. In that open position, the bottom surface of the slide cover bears against the top of ball 142, thereby locking the ball in notch **125*b*. Ball 142 consequently locks crank 125 against both clockwise and counterclockwise rotation. As a result, when cover 141 is in its open position no movement of crank 125** is permitted.

After the subscriber has inserted code ticket 96 into chute **113*a* slide cover 141 must therefore be moved to its closed position before crank 125 may be moved clockwise from its TV to its PV position. Such clockwise rotation of crank 125 is permitted, when the cover is closed, by an inverted V-shaped recess portion 141*b* formed in slide cover 141. The recess is located so that it is positioned directly over ball 142 when the slide cover is in its fully closed position, as shown in FIG. 5. Crank 125 may be rotated clockwise out of its TV position since notch 125*b* cams ball 142 upward into the confines of recess 141*b*. The recess is so dimensioned that ball 142 may be pushed completely out of notch 125*b* to permit crank 125** to be rotated to its PV position.

After crank 125 has been so rotated, recess **141*b* and interlock ball 142 prevent the subscriber from opening cover 141. To explain, in the PV position crank 125 holds ball 142 in recess 141*b*, as shown in FIG. 5, and any attempt by the subscriber to move slide cover 141 from its closed position will be prevented as ball 142 effectively locks recess 141*b* against any movement. Thus, the subscriber will be unable to open cover 141 when knob 93** is in its PV position.

Consideration will now be given to the structural details of the charge recording apparatus. A series of twelve circularly and symmetrically arranged apertures are provided in each of the upright support 100*c* and support bracket 114 to accommodate and guide a series of twelve flexible music wire shafts respectively identified by the letters A, B, C, D, E, F, G, H, J, K, L and M which are the same twelve letters used to designate the positions of control 95 and switch 56. The left ends of shafts A–M are sharp pointed. As will be seen, for each program viewed a selected one of the twelve wire shafts will be driven to the left and through the code ticket, by the action of a spring energized hammer, to punch a hole in recording field 99 of code ticket 96. Wire shafts A–M may therefore appropriately be called punching elements or devices. The shaft selection is determined by the position of control 95. Hence, wire shafts A–M are correlated to the positions A–M of control 95. In other words, when control 95 is in its A position the A shaft will be actuated to punch a hole, when the control is in its B position the B shaft is actuated, and so forth.

Figure 5A:
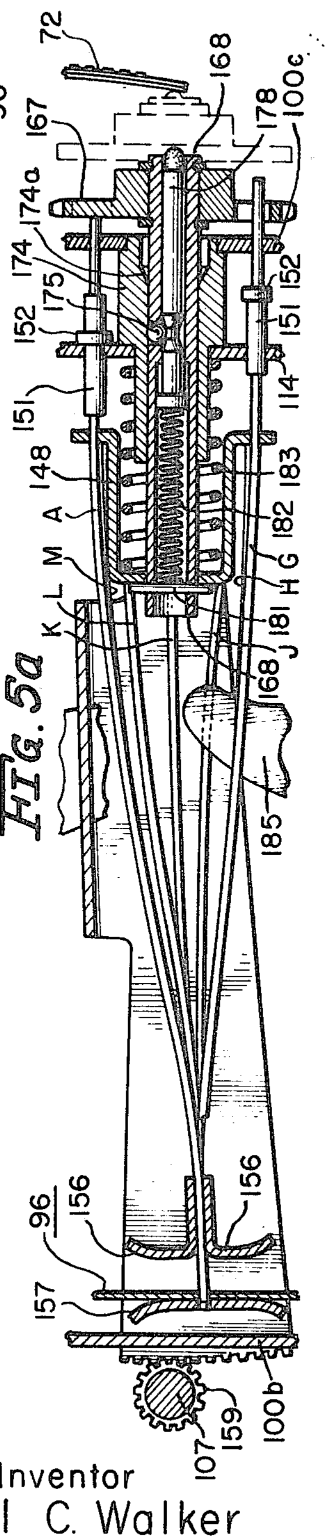

A thimble-shaped stripper sleeve 148 is positioned immediately to the left of bracket 114 and has a series of twelve apertures equally spaced around its circumference to accommodate wire shafts A–M. The wire shafts are free to move horizontally in the apertures in each of upright support 100*c*, bracket 114 and stripper sleeve 148. However, the horizontal movement is limited. Each wire shaft has, rigidly affixed thereto or integral therewith, a pair of enlarged travel stops 151, 152. As shown in FIG. 5, the right end of each stop 151 engages support 100*c* to limit travel toward the right, whereas each stop 152 engages bracket 114 to limit travel toward the left, as illustrated in FIG. 5*a*.

While the right ends of wire shafts A–M are circularly and symmetrically arranged their left ends are lined up in a row, or at the same horizontal level, and concurrently move in a vertical direction by means of an elevating sector 155 of hub form construction, a guide stripper plate 156, and a die block 157. More particularly, the two legs of elevating sector 155 are pivotally mounted to a pair of tabs 114*b* struck out of bracket 114. Guide plate 156 and block 157 are transversely attached to the left ends of the legs of sector 155 and are so spaced that they embrace code ticket 96 as seen in FIG. 5. Guide stripper plate 156 has a series of twelve bores or channels each of which accommodates, for slidable movement, a respective one of wire shafts A–M, see FIG. 7*b*. Similarly, die block 157 contains a corresponding series of twelve apertures each of which registers with a respective one of the channels in stripper plate 156. The extreme left ends of the two legs of elevating sector 155 are toothed and engage a gear 159 rigidly affixed to operating shaft 107. With this arrangement, rotation of control 94 by the subscriber effects vertical movement of guide plate 156 thereby changing the level of wire shafts A–M.

Each time a selected one of punching devices A–M is actuated, a hole is perforated within field 99 at a point location having unique *x* and *y* coordinates and identifying the program with respect to which a charge has been recorded. Hence, recording field 99 may be considered as being effectively divided into a multiplicity of areas each of which has a unique set of ordinate and abscissa coordinates within the field and each of which areas is assigned to, and provides the recording medium for, a different respective one of the 96 subscription television programs served by code ticket 96. Specifically, recording field 99 is divided into 96 different areas or locations each of which is to be pierced by one of punching devices A–M when the assigned one of the 96 different programs is viewed. These areas are arranged in a matrix of eight horizontal rows and twelve vertical columns. As mentioned, FIG. 3 illustrates code ticket 96 after it has been used to decode 29 of the 96 programs, as indicated by the 29 punched holes within recording field 99.

Adjustment of control 94 results in concurrent vertical movement of each of punching devices A–M to a selected one of the eight different rows or levels of recording field 99. The positions of control 94 are, of course, correlated with the rows in field 99 so that manipulation of the control to a given position results in movement of the punching devices to a corresponding assigned row. For example, establishing control 94 in position 3 moves punching devices A–M to the third row from the top in field 99.

The selection of the particular one of shafts A–M to be actuated for any given program is under control of, or determined by, control 95. More particularly, a crown gear 163, rigidly affixed to operating shaft 108, meshes with an idler pinion 164 rotatably mounted on upright support 100*c*. The pinion in turn meshes with a spoked gear 167 which is loosely journaled on a hollow spindle 168. Gear 167 is held onto the spindle for free rotation by means of a pair of E-shaped retaining rings 171. Rotation of control 95 effects rotation of gear 167 via the coupling provided by crown gear 163 and idler pinion 164. Gear 167 has twelve different positions each of which corresponds to a position of control 95. As seen in FIG. 6, spoked gear 167 has a series of eleven spoke voids or apertures so arranged that in any one of its twelve different positions eleven of the punching devices or wire shafts A–M coincide or register with respective ones of the spoke voids. One section of gear 167 is filled in to provide a hammer block which lines up with the twelfth punching device. As illustrated in FIG. 6, shafts A and C–M register with the eleven spoke voids while shaft B aligns with the hammer block. In each of the twelve positions of control 95, spoked gear 167 is rotated so that its hammer block is adjacent the correspondingly lettered wire shaft. FIG. 6 indicates that control 95 has been adjusted to its position B since the hammer block aligns with shaft B.

Obviously, if spoked gear 167 is rapidly actuated or moved to the left from its position shown in FIG. 5 the wire shaft aligned with the hammer block will be driven into recording field 99 of code ticket 96. This is achieved by a spring-energized firing pin or trigger mechanism which is cocked by actuating control knob 93 to its TV position. More particularly, hollow spindle 168 is mounted for free horizontal and axial movement within an outer sleeve 174 which is rigidly mounted to support 100*c* and bracket 114. The spindle has an aperture for accommodating a metallic interlock ball 175 which has a diameter slightly less than twice the spindle wall thickness. In the uncocked or released position of the firing pin mechanism, as shown in FIG. 5*a*, ball 175 lies in a necked down portion of a firing release pin 178 which slides within and operates through the bore of hollow spindle 168. Stripper sleeve 148 is mounted over the left end of spindle 168 and is held in place by a cross pin 181 which is perpendicular to the spindle axis. A coil spring 182 is mounted within the bore of spindle 168 between the left end of firing release pin 178 and cross pin 181. Another coil spring 183 is mounted within stripper sleeve 148 and on the outside of spindle 168 and outer sleeve 174.

Movement of the firing pin mechanism from its uncocked position of FIG. 5*a* to its cocked position (shown in FIG. 5) is facilitated by a "dorsal fin" shaped cam element 185 rigidly affixed to hinge 133. By rotating control 93 from its PV to its TV position cam element 185 engages the left end of spindle 168 and drives it to the right. Cross pin 181 consequently causes stripper sleeve 148 to move to the right and in so doing the sleeve engages the enlarged portion 151 of the particular wire shaft that had previously been actuated to record a use for the last program viewed and moves that shaft or punching device to the right. Movement of spindle 168 to the right also causes firing pin 178 to be projected out of the right end of the spindle by virtue of the force transferred from cross pin 181 to pin 178 by coil spring 182.

The firing pin mechanism is held in its cocked position by ball 175. As spindle 168 is being moved from its uncocked position of FIG. *5a* to its cocked position of FIG. 5, ball 175 is carried toward the right until it lies immediately below the beveled edge or chamber 174*a* of a counterbored recess in outer sleeve 174. Continued movement of the spindle and firing pin 178 to the right causes ball 175 to move or enter into chamber 174*a*. This occurs since the necked-down portion of pin 178 cams ball 175 upwards. In the cocked position, ball 175 effectively locks spindle 168, and those elements mounted thereon, against movement to the left. The cocking process effects compression of spring 183 so there is spring pressure urging the mechanism to the left. The left end of spring 183 exerts a force against sleeve 148 which in turn is transferred to cross pin 181 to urge spindle 168 to the left.

Note in FIG. 5 that in the cocked position the right end of firing pin 178 engages the free end of the cantilever mounted bimetal heater 72 and spoked gear 167 engages movable contact 69 of switch 70 and deflects it into electrical engagement with fixed contact 71. When bimetal heater 72 is energized and physically bends or deflects (as shown in FIG. *5a*), firing release pin 178 is pushed to the left by the free end of heater 72 and when the necked-down portion of the firing pin lies beneath ball 175 the ball will drop therein, thereby removing the lock between spindle 168 and outer sleeve 174. Spindle 168 and spoked gear 167 are therefore propelled rapidly to the left under the spring tension stored in coil spring 183. The particular selected one of punching devices A–M adjacent the hammer block of gear 167 at the time will be driven by the hammer block toward and through code ticket 96 to perforate a hole therein at the particular location determined by the adjustments of controls 94 and 95. The other eleven punching devices, which are aligned with the elevent voids of gear 167, remain in position and will enter those voids as gear 167 is moved to the left, as best seen in FIG. *5a*. It is thus apparent that control 94 selects the level or row in field 99 where the punch is to be made, while control 95 selects the column in field 99. The hole is punched at the intersection.

The construction of normally-closed switch 60, which comprises movable contact 61 and fixed contact 62, is shown in FIG. 5. In the cocked position of the triggering mechanism the toothed periphery of spoked gear 167 is immediately to the right of an inverted V portion of contact 61, while in the uncocked or released position gear 167 lies immediately to the left of the inverted V portion. However, for intermediate positions of gear 167 contact 61 is engaged by the gear and moved away from its fixed contact 62, thereby opening the contacts. Hence, if gear 167 is not driven all the way to its leftmost position, and therefore fails to effect registration of a charge, the gear will be in an intermediate position to open switch 60. This prevents the application of an enabling voltage (i.e. filament voltage) to second video amplifier 16.

Switch 60 is particularly useful to frustrate the efforts of any unscrupulous subscriber bent on fraud who tries to prevent the registration of charges by inserting a metal plate alongside and to the right of code ticket 96. When an actuated punching device is stopped by the metal plate, gear 167 is also stopped and in a position where it will open contacts 61 and 62.

Provision is made to prevent the subscriber from manipulating controls 94 and 95 when control 93 is in its PV position. This is facilitated by a pair of star wheels 191, 192 rigidly affixed to operating shafts 107, 108, respectively, in the space between the front wall of cabinet 90 and support plate 102. Rigidly mounted to operating shaft 106 in the same space is a cam element 193 having a pair of notches 193*a*, only one of which is shown in FIG. 4. A pair of push rods 195, 196 are slidably mounted in apertures of struck-out tabs 102*a* of front plate 102. Star wheel 191 has a V-shaped recess or notch for each of the eight detented position of control 94, and star wheel 192 contains a notch for each of the twelve detented positions of control 95. When control 93 is in its PV position, the left end of push rod 195 extends in a notch of wheel 191 while the right end engages the outer periphery of cam 193. Similarly, the right end of rod 196 extends into a recess of wheel 192 and its left end engages the outer periphery of cam 193. The two star wheels are therefore locked in position, thereby preventing controls 94 and 95 from being adjusted. When contol 93 is actuated to its TV position, however, the two notches 193*a* lie adjacent rods 195, 196 and permit the rods to move toward operating shaft 106 and out of the notches of the star wheels under the camming action of the star wheels which occurs when controls 94 and 95 are adjusted. Hence, the push rods do not lock controls 94 and 95 when control 93 is in its TV position.

The operation of the entire receiver for a given selected program will now be reviewed. The subscriber is initially required to push slide cover 141 to its open position as shown in FIG. 2 and this can only be done if control 93 has first been established in its TV position. Manipulation of control 93 to that position will move the firing pin mechanism to its cocked position, shown in FIG. 5. It will be assumed that code ticket 96 contains, in its laminated or pleated portion, the necessary conductive circuit paths capable of interconnecting conductors 41–46 to conductors 51–55 in accordance with the permutation pattern required for the program under consideration. Code ticket 96 may now be inserted into slot 113*a* to assume the position shown in FIG. 5 and slide cover 141 moved to its closed position.

The subscriber must now adjust controls 94 and 95 to the particular positions required for the given selected program. It is contemplated that this information may be disseminated to the subscriber by means of a program guide, newspaper listings, etc. It will be recalled that for each one of the 96 different programs, for which code ticket 96 may be employed, the combination of settings of controls 94 and 95 will be different. Control 94 adjusts permuting switch 40 to establish the correct interconnection pattern between conductors 21–26 and conductors 41–46. At the same time elevating sector 155 and guide stripper plate 156 are positioned by control 94 to move all twelve punched devices A–M to the row or level in recording field 99 containing the area in the 8 x 12 matrix assigned to the program in question and in which area a charge is to be recorded. Manipulation of control 95 effects rotation of spoked gear 167 to move the hammer block portion thereof in alignment with the particular one of the twelve punching devices which is assigned to the column in recording field 99 containing the area for the program under consideration. Hence, control 94 effects the selection of the ordinate coordinate of the particular area in which a charge is to be recorded, while control 95 causes the selection of the abscissa coordinate of that area. The charge recording apparatus is thus conditioned to record a charge which will identify the program utilized.

Control 93 may then be actuated to its PV position, by which process the eleven sensing probes 119 pierce the laminated portion of code ticket 96 and effectively read the conductive circuit paths therein to permutably connect conductors 41–46 to conductors 51–55. Adjustable switching apparatus 30 is now established in the particular condition of adjustment required to decode the program in question. The television signal for that program, which signal has been coded at the transmitter by delaying certain time segments of video information, is intercepted by antenna 11, amplified in the radio frequency amplifier and heterodyned to the selected intermediate frequency of the receiver in the first detector. The intermediate frequency signal is amplified in the intermediate frequency amplifier and detected in the second detector to produce a coded composite video signal which is then amplified in the first video amplifier. The amplified video is translated through the cascade arrangement of video decoder 14 and second video amplifier 16 to the input electrodes of picture tube 18 to control the intensity of the cathode ray beam thereof in conventional manner. Of course, this occurs only after the filament of second video amplifier 16 has been energized in a manner to be described. The sweep systems in unit 19 are controlled in conventional manner by the synchronizing signal separator.

Unit 20 separates and rectifies the random code and correlation signal components from the composite video signal and applies these components to input conductors 21–26 of switching apparatus 30, and since the apparatus is properly conditioned those components will be correctly routed to output conductors 31–35. The code components will therefore be channeled to the appropriate inputs of the bistable multivibrator in mode-determining circuitry 57. That multivibrator, which is periodically actuated by the output of the line-drive pulse driven 7:1 blocking oscillator, is triggered by the random code signal components in exact synchronism with the actuation of the corresponding multivibrator in the transmitter.

The rectangular shaped decoding signal, produced in the output of the receiver mode-determining circuitry, thus has a waveform which is identical to that of the coding signal in the transmitter. The electronic switch in decoder 14 will therefore be actuated by the decoding signal in time synchronism with the counterpart electronic switch in the transmitter coder, which is necessary to decode the received coded television signal.

Since the receiver switching apparatus is properly set up, the correlation signal components applied to correlation testing circuitry 58 will exhibit the required relationship with respect to the waveform of the decoding signal developed by unit 57 and applied to unit 58. Correlation testing circuitry 58 will therefore confirm the fact of correlation and apply filament voltage, via conductors 59 and 63 and normally-closed switch 60, to second video amplifier 16. Unit 58 also energizes relay 65 to effect completion of the energizing circuit for bimetal heater 72. It will be recalled that when the firing pin mechanism is in its cocked position (shown in FIG. 5), contacts 69 and 71 of switch 70 are closed. As a consequence, when relay 65 energizes and closes contacts 66 and 67 bimetal heater 72 heats up from voltage source 76 and physically deflects such that its free or lowermost end moves toward the left, as indicated in FIG. 5*a*. This actuates firing pin 178 and triggers the firing pin mechanism, causing the hammer block of gear 167 to drive the selected punching device toward and through code ticket 96 to punch a hole in the area or location assigned to the program under consideration.

Upon the conclusion of the given program and before a succeeding one of the series of 96 different programs covered by the code ticket may be utilized, the subscriber is obliged to rotate control 93 to its TV position. This effects recocking of the firing pin mechanism, stripping of the punching device used for recording the last charge, and release of the lock provided by push rods 195 and 196 against movement of controls 94 and 95. Those controls may then be positioned to the unique setting combination required to utilize the next program in the series to which the subscriber desired to subscribe.

After all of the 96 programs in the series covered by code ticket 96 have terminated, the subscriber will be requested to rotate control 93 to its TV position and push slide cover 141 back to its open position. Code ticket 96 may now be removed. Of course, the dished out portion 113*b* formed in plastic top plate 113 above slot 113*a* facilitates convenient gripping of the code ticket for removal.

The used code ticket now contains, within recording field 99, up to 96 different holes signifying the particular ones of the 96 programs viewed by the subscriber. As indicated by the 29 perforations within field 99, 29 different programs of the series of 96 were utilized by the subscriber. The code ticket may then be returned to the subscription television operating company for billing purposes.

The invention provides, therefore, a novel charge register for a subscription television receiver for recording charges only for selected programs to which the subscriber actually subscribes. An adjustable apparatus must be established by the subscriber in a different condition of adjustment for each program before the television signal for that program may be intelligibly reproduced. A separate charge is recorded within a two-dimensional recording field on a removable planar element for each of the selected programs, each charge being recorded in a different assigned area having a unique set of ordinate and abscissa coordinates in the field and determined by the setting of the adjustable apparatus.

While a particular embodiment of the invention has been shown and described, modifications may be made, and it is intended in the appended claims to cover all such modifications as may fall within the true spirit and scope of the invention.

I claim:

1. A subscription television receiver to which is transmitted over the same television channel television signals for a multiplicity of different subscription television programs and wherein charges are to be recorded only for those selected programs to which the subscriber actually subscribes, comprising:

an adjustable apparatus having a multiplicity of different conditions of adjustment and which must be established by the subscriber in a different predetermined condition of adjustment for each subscription program before the television signal for that program may be intelligibly reproduced;

a charge register including a removable planar element having a two-dimensional recording field effectively divided into a multiplicity of areas each of which has a unique set of ordinate and abscissa coordinates within said field and each of which areas is assigned to, and provides the recording medium for, a different respective one of said multiplicity of subscription television programs; and control means at least partially responsive to adjustment of said adjustable apparatus for controlling said charge register to record on said removable element a separate charge in each of the areas assigned to those selected programs to which the subscriber subscribes, the ordinate and abscissa coordinates of each area, in which a charge is recorded, being determined by the adjustment of said adjustable apparatus for the program to which that area is assigned.

2. A subscription television receiver according to claim 1 in which said charge register includes means for providing an aperture in each of the areas assigned to the selected programs, thereby registering charges for those programs.

3. A subscription television receiver according to claim 1 in which said charge register includes a punching mechanism positioned and actuated by said control means to punch a hole, thereby to record a charge, in each of the areas assigned to the selected programs.

4. A subscription television receiver according to claim 1 in which said charge register includes a series of punching devices, one of which is positioned and actuated by said control means for each of the selected programs to punch a hole in the area assigned to that selected program.

5. A subscription television receiver according to claim 1 in which said charge register includes a piercing mechanism capable of selectively piercing any one of said multiplicity of areas within said two-dimensional field; and wherein said control means determines, for each of the selected programs, the particular area pierced.

6. A subscription television receiver according to claim 1 wherein said charge register, for each of the selected programs and under the control of said control means, selects the area assigned to the selected program and in which a charge is to be recorded.

7. A subscription television receiver according to claim 6 in which said adjustable apparatus includes two multiposition controls to be adjusted by the subscriber to particular given positions for each of the selected programs; and wherein said control means responds, for each selected program, to the adjustment of one of said controls to effect the selection of the ordinate coordinate of the particular area in which a charge is to be recorded and to the adjustment of the other of said controls to effect the selection of the abscissa coordinate of that area.

8. A subscription television receiver according to claim 7 in which said charge register includes a series of punching devices concurrently movable by said one control in accordance with the ordinate coordinate of the selected area in which a charge is to be recorded; and wherein said other control effects the selection of a particular one of said punching devices in accordance with the abscissa coordinate of the selected area, said particular punching device being actuated by said control means to punch a hole in the selected area.

9. A subscription television receiver, according to claim 7, to which is transmitted television signals for $M \times N$ different subscription television programs, where M and N are integers greater than 1; wherein said one control has M different positions;

said other control has N different positions;

the recording field of said removable element is effectively divided into $M \times N$ areas arranged in a matrix of M rows and N columns;

said charge register includes a series of N punching devices, each assigned to a respective column, concurrently movable by said one control to the row containing the selected area in which a charge is to be recorded; and wherein said other control effects the selection of the particular punching device assigned to the column containing the selected area, said particular punching device being actuated by said control means to punch a hole in the selected area.

10. A subscription television receiver according to claim 1 in which said adjustable apparatus has two different adjustable controls to be adjusted by the subscriber to particular given positions for each of the selected programs;

the multiplicity of areas in said recording field are arranged in rows and columns with the ordinate and abscissa coordinates of each area indicating the row and column respectively in which that area is located;

said charge register, for each of the selected programs and under the control of said control means, selects the area assigned to the selected program and in which a charge is to be recorded; and wherein said control means responds, for each selected program, to the adjustment of one of said controls to effect the selection of the particular row in which the selected area is located and to the adjustment of the other of said controls to effect the selection of the particular column in which that area is located.

11. A subscription television receiver according to claim 1 including enabling means controlled at least partially by said adjustable apparatus for enabling said receiver to intelligibly reproduce the television signal for each of the selected programs; and means operable, in the event that said charge register fails to record a charge for any given one of the selected programs, for disabling said receiver.

12. A subscription television receiver to which is transmitted over the same television channel television signals for a multiplicity of different subscription television programs and wherein charges are to be registered, within a two-dimensional field on a removable planar element, only for those selected programs to which the subscriber actually subscribes, comprising:

an adjustable apparatus having a multiplicity of different conditions of adjustment and which must be established by the subscriber in a different predetermined condition of adjustment for each subscription program before the television signal for that program may be intelligibly reproduced; and means at least partially responsive to adjustment of said adjustable apparatus for recording on said removable element a separate charge for each of those selected programs to which the subscriber subscribes, each charge being recorded in a different assigned area having a unique set of ordinate and abscissa coordinates within said two-dimensional field determined by the adjustment of said adjustable apparatus.

13. A subscription television receiver to which is transmitted coded television signals for a multiplicity of different subscription television programs, and wherein a removable code-bearing planar element containing code information is employed to decode said multiplicity of programs, and in which charges are to be assessed only for those selected programs to which the subscriber actually subscribes, comprising:

adjustable decoding apparatus which must be established by the subscriber in a different predetermined condition of adjustment for each of the selected programs and which also must be provided with the code information contained in said code-bearing element before the coded television signal for each of the selected programs may be decoded and intelligibly reproduced;

sensing means included in said adjustable decoding apparatus for deriving the code information from said code-bearing element for each of the selected programs; and means at least partially responsive to adjustment of said adjustable apparatus for recording within a two-dimensional field on said removable code-bearing element a separate charge for each of the selected programs to which the subscriber subscribes, each charge being recorded in a different assigned area having a unique set of ordinate and abscissa coordinates within said field.

14. A subscription television receiver to which is transmitted coded television signals for a multiplicity of different subscription television programs and wherein charges are to be registered, within a two-dimensional recording field on a removable planar element, only for those selected programs to which the subscriber actually subscribes, comprising:

a decoding device which must be operated in accordance with a predetermined and different code schedule for each of the selected programs before the coded television signals for those programs may be decoded and intelligibly reproduced;

means including a pair of individually adjustable matrices, to be adjusted by the subscriber to particular given positions for each of the selected programs, for operating said decoding device in accordance with the required code schedule for each of the selected programs; and means at least partially responsive to adjustment of said matrices for recording on said removable element a separate charge for each of the selected programs, each charge being recorded in a different assigned area having a unique set of ordinate and abscissa coordinates within said two-dimensional field with the ordinate coordinate determined by the adjustment of one of said matrices and the abscissa coordinate determined by the adjustment of the other of said matrices.

15. A subscription television receiver to which is transmitted coded television signals for a multiplicity of different subscription television programs and wherein charges are to be registered, within a two-dimensional recording field on a removable planar element, only for those selected programs to which the subscriber actually subscribes, comprising:

adjustable decoding apparatus which must operate in accordance with a predetermined and different code schedule for each of the selected programs before the coded television signals for those programs may be decoded, and which must be positioned by the subscriber to a different prescribed adjustment for each of the selected programs in order to operate said decoding apparatus in accordance with the required code schedule; and means at least partially responsive to adjustment of said adjustable decoding apparatus for recording on said removable element a separate charge for each of the selected programs, each charge being recorded in a different assigned area within said two-dimensional field having a unique set of ordinate and abscissa coordinates determined by the adjustment of said decoding apparatus.

References Cited

UNITED STATES PATENTS

| | | | |
|---|---|---|---|
| 2,788,387 | 4/1957 | Druz | 178—5.1 |
| 2,817,824 | 12/1957 | Albright | 178—5.1 X |
| 3,051,775 | 8/1962 | Novak et al. | 178—5.1 |
| 3,211,830 | 10/1965 | Sargent | 178—5.1 X |
| 3,335,421 | 8/1967 | Sargent et al. | 178—5.1 X |

RODNEY D. BENNETT, Primary Examiner

M. F. HUBLER, Assistant Examiner